(12) United States Patent
Homma (10) Patent No.: US 9,847,548 B2
(45) Date of Patent: Dec. 19, 2017

(54) IONIC CONDUCTOR AND SECONDARY BATTERY (71) Applicant: FUJITSU LIMITED, Kawasaki-shi, Kanagawa (JP)

(72) Inventor: Kenji Homma, Atsugi (JP)

(73) Assignee: FUJITSU LIMITED, Kawasaki (JP)

( * ) Notice: Subject to any disclaimer, the term of this patent is extended or adjusted under 35 U.S.C. 154(b) by 485 days.

(21) Appl. No.: 14/636,874

(22) Filed: Mar. 3, 2015

(65) Prior Publication Data
US 2015/0180085 A1 Jun. 25, 2015

Related U.S. Application Data (63) Continuation of application No. PCT/JP2012/073535, filed on Sep. 13, 2012.

(51) Int. Cl.
| | |
|---|---|
| *H01M 10/0562* | (2010.01) |
| *H01M 10/0525* | (2010.01) |
| *H01M 4/131* | (2010.01) |
| *H01M 4/58* | (2010.01) |
| *H01M 10/052* | (2010.01) |
| *H01M 4/04* | (2006.01) |
| *H01M 4/136* | (2010.01) |
| *H01B 1/08* | (2006.01) |

(52) U.S. Cl.
CPC ..... *H01M 10/0562* (2013.01); *H01M 4/0407* (2013.01); *H01M 4/136* (2013.01); *H01M 4/5825* (2013.01); *H01M 10/052* (2013.01); *H01M 10/0525* (2013.01); *H01B 1/08* (2013.01); *H01M 2300/0068* (2013.01); *H01M 2300/0071* (2013.01)

(58) Field of Classification Search
None
See application file for complete search history.

(56) References Cited

U.S. PATENT DOCUMENTS

| 2007/0148553 A1 | 6/2007 | Weppner |
| 2011/0244337 A1 | 10/2011 | Ohta et al. |

FOREIGN PATENT DOCUMENTS

| JP | 8-198638 | 8/1996 |
| JP | 2007-528108 | 10/2007 |
| JP | 2010-199061 | 9/2010 |
| JP | 2010-272344 | 12/2010 |
| JP | 2012-146630 | 8/2012 |

OTHER PUBLICATIONS

Kuang et al., "Synthesis and electrochemical properties of layered lithium monodiphosphate Li9V3—xAlx(P2O7)3(PO4)2 solid solutions", Electrochimica Acta, 58 (2011), pp. 296-302.*
Patent Abstracts of Japan, Publication No. 2010-199061, published Sep. 9, 2010.
Bibliographic Information and Abstract of WO 2005/085138 A1, published Sep. 15, 2005.

(Continued)

*Primary Examiner* — Barbara Gilliam
*Assistant Examiner* — Helen M McDermott
(74) *Attorney, Agent, or Firm* — Staas & Halsey LLP (57) ABSTRACT

An ionic conductor is provided, wherein a composition formula thereof is $Li_{9+x}Al_3(P_2O_7)_3(PO_4)_{2-x}(GeO_4)_x$, wherein x is a range of $0 < x \leq 2.0$.

20 Claims, 9 Drawing Sheets

(56) References Cited

OTHER PUBLICATIONS

Patent Abstracts of Japan, Publication No. 2010-272344, published Dec. 2, 2010.
Patent Abstracts of Japan, Publication No. 8-198638, published Aug. 6, 1996.
Patent Abstracts of Japan, Publication No. 2012-146630, published Aug. 2, 2012.
Hong, "Crystal Structure and Ionic Conductivity of $Li_{14}Zn(GeO_4)_4$ and Other New Li+ Superionic Conductors", *Materials Research Bulletin*, 1978, vol. 13, Issue 2, pp. 117-124 (Lisicon).
Inaguma et al., "High Ionic Conductivity in Lithium Lanthanum Titanate", *Solid State Communications*, 1993, vol. 86, Issue 10, pp. 689-693.
Kamaya et al., "A lithium superionic conductor", *Nature Materials*, Jul. 31, 2011, vol. 10, pp. 682-686.
Yamane et al., "Crystal structure of a superionic conductor, $Li_7P_3S_{11}$", *Solid State Ionics*, 178 (2007), pp. 1163-1167.
Kuang et al., "Layered monodiphosphate $Li_9V_3(P_2O_7)_3(PO_4)_2$: A novel cathode material for lithium-ion batteries", *Electrochimica Acta*, 56 (2011), pp. 2201-2205.
Murugan et al., "Fast Lithium Ion Conduction in Garnet-Type $Li_7La_3Zr_2O_{12}$", *Angew. Chem. Int. Ed.*, 2007, 46, pp. 7778-7781.
Hayashi et al., "Formation of superionic crystals from mechanically milled $Li_2S$-$P_2S_5$ glasses", *Electrochemistry Communications*, 2003, 5, pp. 111-114.
Jain et al., "A Computational Investigation of $Li_9M_3(P_2O_7)_3(PO_4)_2$ (M=V, Mo) as Cathodes for Li Ion Batteries", *Journal of the Electrochemical Society*, 2012, 159 (5), pp. A622-A633.
Kuang et al., "Synthesis, Structure, Electronic, Ionic, and Magnetic Properties of $Li_9V_3(P_2O_7)_3(PO_4)_2$ Cathode Material for Li-Ion Batteries", *The Journal of Physical Chemistry*, 2011, 115, pp. 8422-8429.
International Search Report dated Nov. 6, 2012 in corresponding International Patent Application No. PCT/JP2012/073535.

\* cited by examiner

$Li_{10}Al_3(P_2O_7)_3(PO_4)(GeO_4)$

Ge content $x$ in $Li_{9+x}Al_3(P_2O_7)_3(PO_4)_{2-x}(GeO_4)_x$

IONIC CONDUCTOR AND SECONDARY BATTERY

CROSS-REFERENCE TO RELATED APPLICATION(S)

This application is a continuation application of International Application No. PCT/JP2012/073535 filed on Sep. 13, 2012 and designated the U.S., the entire contents of which are herein incorporated by reference.

FIELD

A certain aspect of the embodiments discussed herein relates to an ionic conductor and a secondary battery.

BACKGROUND

In an energy power harvesting technique that stores, and utilizes for a sensor or wireless transmission electric power, electric power generated from minute energy such as sunlight, oscillation, or a body temperature of a human being or an animal, a safe and highly reliable secondary battery under any terrestrial environment is desired. A secondary battery that has widely been utilized at present uses an organic electrolyte solution that is a liquid, and may cause a positive electrode active substance to be degraded due to multiple use thereof and a capacitance of the battery to be lowered or may cause an organic electrolyte in the secondary battery to be ignited and take fire due to a battery short circuit caused by formation of a dendrite. Therefore, it is not preferable to use a current secondary battery that uses an organic electrolyte solution, in, for example, energy power harvesting wherein utilization for 10 years or more is expected, from the viewpoint of reliability or safety thereof.

On the other hand, attention is being paid to an all-solid lithium secondary battery that does not use an organic electrolyte and is entirely formed of solid component materials, because there is not a risk of solution leaking, firing, or the like and a cycle characteristic thereof is also excellent. For a lithium-ionic conductor that is a solid electrolyte to be used for such an all-solid lithium secondary battery, there is provided an oxide type, a sulfide type, or the like. For an oxide type, there is provided a LISICON (LIthium SuperIonic CONductor) structure based on $Li_3PO_4$ or $Li_4GeO_4$, a NASICON (Na SuperIonic CONductor) structure based on an sodium-ionic conductor, a LiLaZrO garnet structure, a perovskite structure such as an LLTO, or the like. Furthermore, for a sulfide type, there is provided $Li_{10}GeP_2S_{11}$, $Li_7P_3S_{11}$, or the like.

Meanwhile, although $LiCoO_2$ (theoretical capacitance: 137 mAh/g) has widely spread for a positive electrode material of a secondary battery, Electrochimica Acta 56 (2011) 2201-2205 discloses, in a recent year, $Li_9V_3(P_2O_7)_3(PO_4)_2$ (theoretical capacitance: 173 mAh/g) that exceeds this. This $Li_9V_3(P_2O_7)_3(PO_4)_2$ utilizes an oxidation reduction reaction of $V^{3+} \rightarrow V^{5+}$, and has a theoretical capacitance that is 1.2 times as large as that of $LiCoO_2$.

However, $Li_9V_3(P_2O_7)_3(PO_4)_2$ is a material with a crystal structure that is greatly different from that of conventional $LiCoO_2$ that has been used as a positive electrode material, and an ionic conductor has not existed that is a solid electrolyte suitable for $Li_9V_3(P_2O_7)_3(PO_4)_2$.

SUMMARY

According to an aspect of the embodiments, there is provided an ionic conductor, wherein a composition formula is $Li_{9+x}Al_3 (P_2O_7)_3 (PO_4)_{2-x}(GeO_4)_x$, wherein x is a range of $0<x \leq 2.0$.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Embodiments for implementing the invention will be described below. Here, an identical letter or numeral will be attached to an identical member or the like and a description(s) thereof will be omitted.

A First Embodiment

As described previously, $Li_9V_3(P_2O_7)_3(PO_4)_2$ utilizes an oxidation reduction reaction of $V^{3+} \rightarrow V^{5+}$, and has a theoretical capacitance that is 1.2 times as large as that of $LiCoO_2$. Because this $Li_9V_3(P_2O_7)_3(PO_4)_2$ has a crystal structure that is different from that of $LiCoO_2$, an ionic conductor that is a solid electrolyte with a high matching property with $Li_9V_3(P_2O_7)_3(PO_4)_2$ has not existed at present. Therefore, even though a secondary battery is fabricated by combining a known ionic conductor with $Li_9V_3(P_2O_7)_3(PO_4)_2$ as an electrostatic electrode, it is not possible to derive an effect of using $Li_9V_3(P_2O_7)_3(PO_4)_2$ sufficiently at present. Hence, an ionic conductor is desired wherein it is possible to derive an effect of using $Li_9V_3(P_2O_7)_3(PO_4)_2$ sufficiently.

Meanwhile, the inventor executed a study for a preferable ionic conductor in a case where $Li_9V_3(P_2O_7)_3(PO_4)_2$ was used as a positive electrode material, and as a result, conceived and reached an idea that an ionic conductor with a crystal structure similar to that of $Li_9V_3(P_2O_7)_3(PO_4)_2$ provided a high matching property. As a result of synthesis of an ionic conductor that was tried based on this idea, it was possible to obtain an ionic conductor that had a crystal structure similar to that of $Li_9V_3(P_2O_7)_3(PO_4)_2$, namely, in a space group of P-3c1 (165). The present embodiment is based on such a process, and it is possible to improve a characteristic of a secondary battery more than a conventional one by using $Li_9V_3(P_2O_7)_3(PO_4)_2$ as a positive electrode material and using an ionic conductor in the present embodiment as a solid electrolyte.

(An Ionic Conductor)

Figure 1:
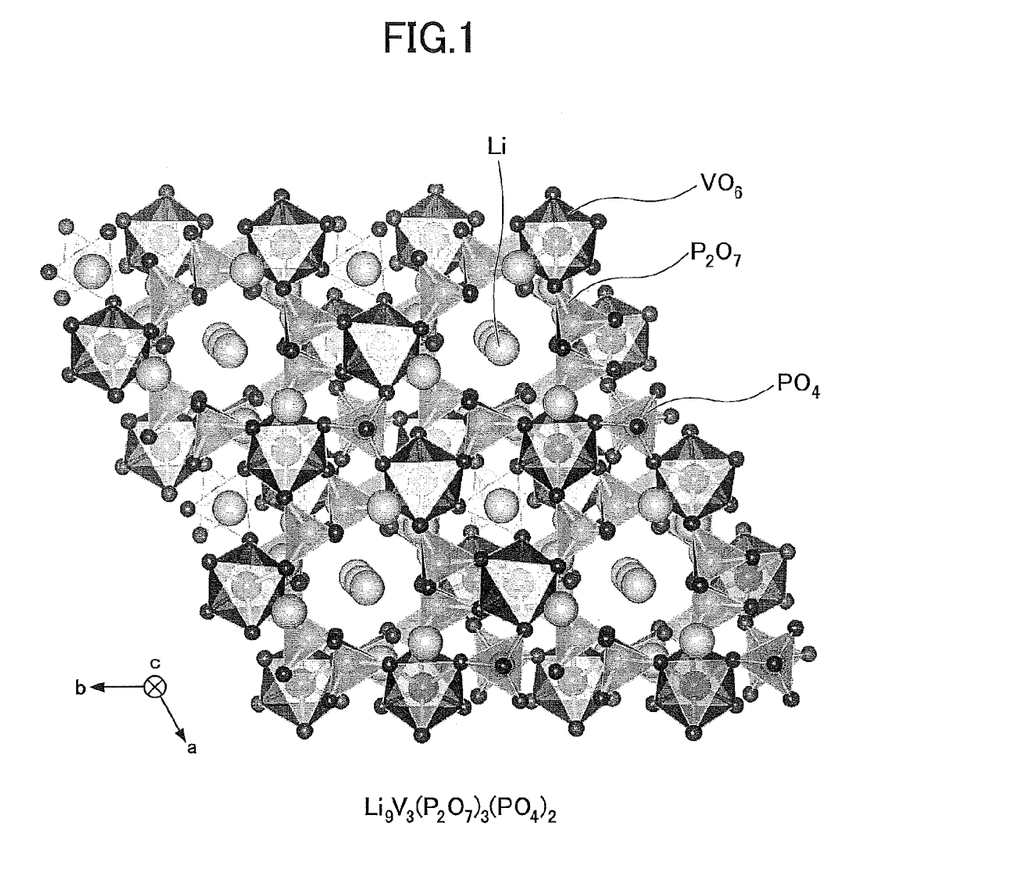
FIG. 1 is a structural diagram of LVPP that is used as a positive electrode material.

First, $Li_9V_3(P_2O_7)_3(PO_4)_2$ will be described that is a positive electrode material of a secondary battery. As illustrated in FIG. 1, $Li_2V_3(P_2O_7)_3(PO_4)_2$ is formed of Li (lithium), $VO_6$, $P_2O_7$, and $PO_4$. $Li_2V_3(P_2O_7)_3(PO_4)_2$ is such that a space group thereof is P-3c1 (165) and there is an anisotropy in a direction of a c-axis that is a diffusion pathway. Here, $Li_9V_3(P_2O_7)_3(PO_4)_2$ may be described as an LVPP in the present embodiment.

Figure 2:
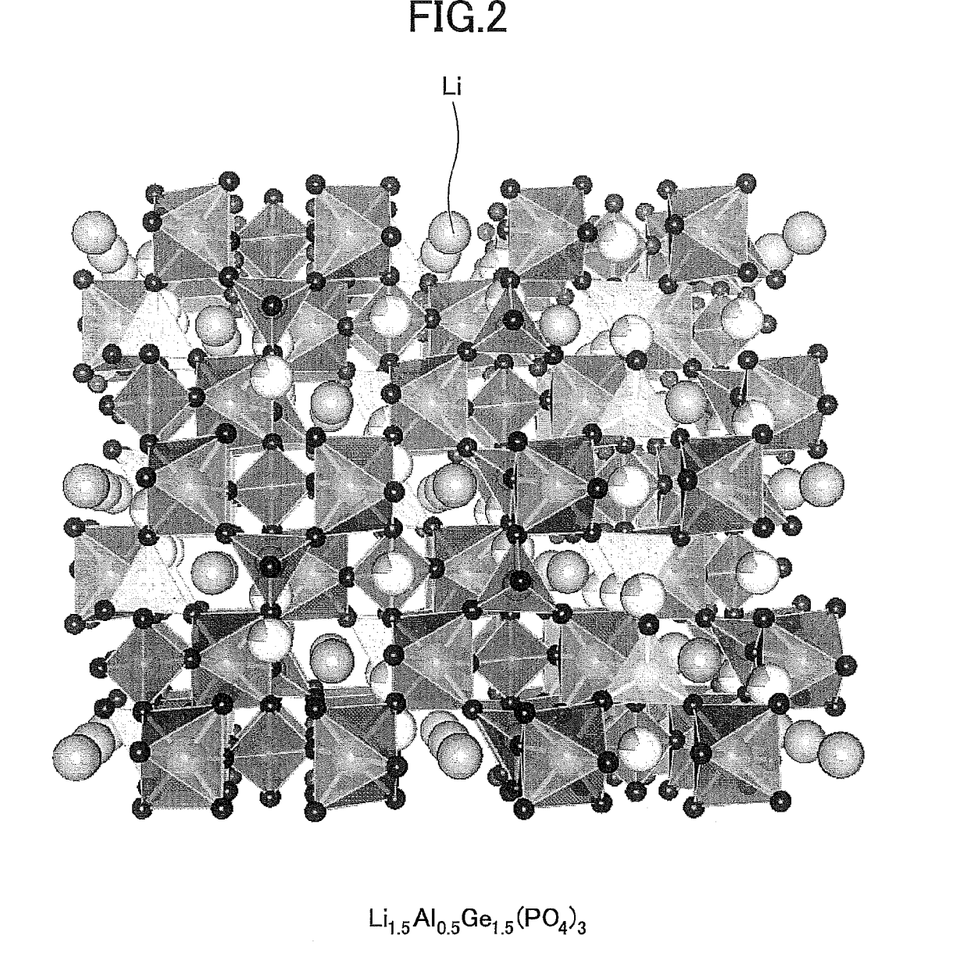
FIG. 2 is a structural diagram of an ionic conductor with a NASICON structure.

On the other hand, FIG. 2 illustrates $Li_{1.5}Al_{0.5}Ge_{1.5}(PO_4)_3$ that is a solid electrolyte with a NASICON structure that is commonly used as a solid electrolyte. $Li_{1.5}Al_{0.5}Ge_{1.5}(PO_4)_3$ is such that a space group thereof is R-3cH (167), and a crystal structure thereof is different from that of $Li_9V_3(P_2O_7)_3(PO_4)_2$, and further, a diffusion pathway of lithium is also different from that of $Li_9V_3(P_2O_7)_3(PO_4)_2$ and is isotropic. In this $Li_{1.5}Al_{0.5}Ge_{1.5}(PO_4)_3$, a migration distance of lithium from a solid electrolyte to an outermost surface of a positive electrode is 12.769 angstrom.

Next, an ionic conductor for forming a solid electrolyte in the present embodiment will be described. An ionic conductor in the present embodiment is $Li_{9+x}Al_3(P_2O_7)_3(PO_4)_{2-x}(GeO_4)_x$, wherein a part of $(PO_4)$ in $Li_9V_3(P_2O_7)_3(PO_4)_2$ is replaced by $(GeO_4)$. Herein, x is a range of $0<x\leq2.0$. Thus, a part of $(PO_4)$ is replaced by $(GeO_4)$, so that Li is increased accordingly and a carrier is also increased. Here, $Li_9V_3(P_2O_7)_3(PO_4)_2$ may be described as LAPP and $Li_{9+x}Al_3(P_2O_7)_3(PO_4)_{2-x}(GeO_4)_x$ may be described as an LAPPG in the present embodiment.

Figure 3:
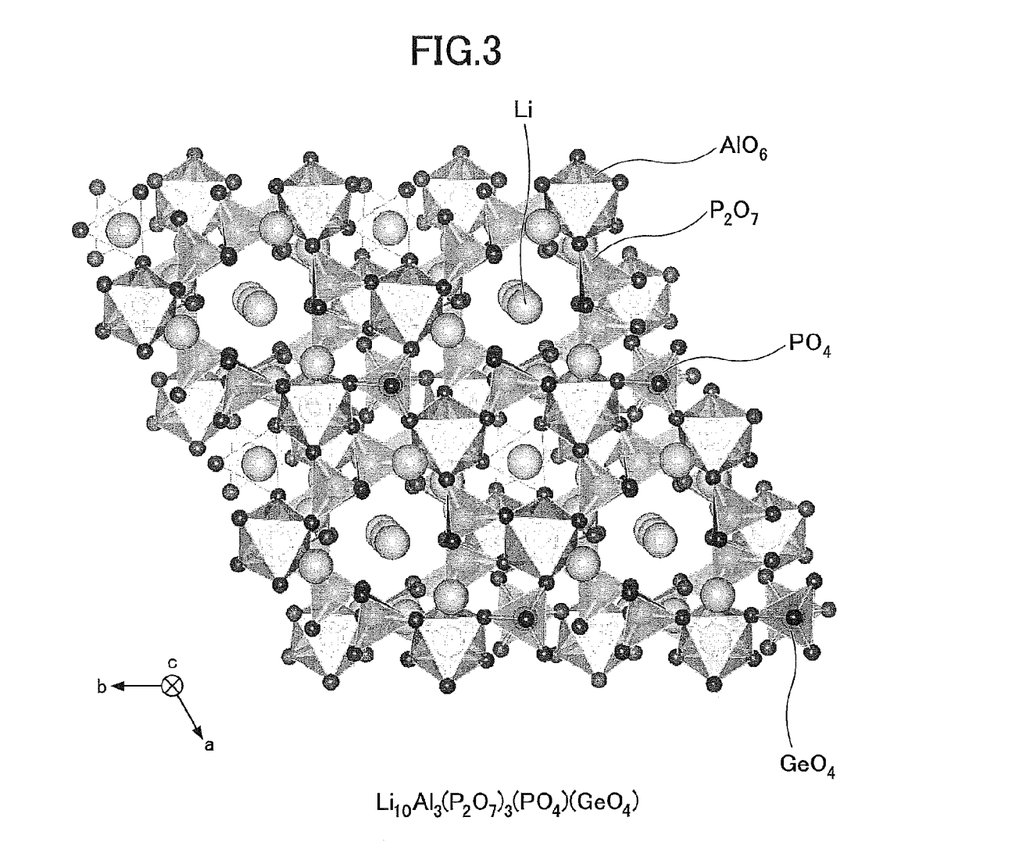
FIG. 3 is a structural diagram of an ionic conductor in a first embodiment.

FIG. 3 illustrates a structure of $Li_{10}Al_3(P_2O_7)_3(PO_4)(GeO_4)$ that is an ionic conductor in the present embodiment. This $Li_{10}Al_3(P_2O_7)_3(PO_4)(GeO_4)$ is formed of Li (lithium), $AlO_6$, $P_2O_7$, $PO_4$, and $GeO_4$. $Li_{10}Al_3(P_2O_7)_3(PO_4)(GeO_4)$ in the preset embodiment has a crystal structure similar to that of $Li_9V_3(P_2O_7)_3(PO_4)_2$ that is a positive electrode material, wherein a space group is P-3c1 (165) and there is an anisotropy in a direction of a c-axis that is a diffusion pathway of lithium. That is, a space group is had that is a crystal structure identical to that of $Li_9V_3(P_2O_7)_3(PO_4)_2$ that is a positive electrode material and an anisotropy is had that is similar to a diffusion pathway of lithium. Therefore, a matching property with $Li_9V_3(P_2O_7)_3(PO_4)_2$ that is a positive electrode material is high. Furthermore, a migration distance of lithium from a solid electrolyte of this ionic conductor to an outermost surface of a positive electrode is 6.797 angstrom that is less than that of LAGP, so that it is possible to reduce a migration resistance between lithium sites.

Furthermore, an ionic conductor in the present embodiment may be $Li_{9+x}Al_3(P_2O_7)_3(PO_4)_{2-x}(SiO_4)_x$ wherein a part of $(PO_4)$ is replaced by $(SiO_4)$, other than $Li_{9+x}Al_3(P_2O_7)_3(PO_4)_{2-x}(GeO_4)_x$ as described above. Furthermore, $Li_{9+x}Al_3(P_2O_7)_3(PO_4)_{2-x}(SiO_4)_{x/2}(GeO_4)_{x/2}$ may be provided wherein a part of $(PO_4)$ is replaced by $(SiO_4)$ and $(GeO_4)$. Here, in the present embodiment, $Li_{9+x}Al_3(P_2O_7)_3(PO_4)_{2-x}(SiO_4)_x$ may be described as an LAPPS and $Li_{9+x}Al_3(P_2O_7)_3(PO_4)_{2-x}(SiO_4)_{x/2}(GeO_4)_{x/2}$ may be described as an LAPPSG.

Moreover, it is considered that it is possible for an element such as C, Sn, or Pb to obtain a similar effect, other than Ge in $(GeO_4)$ and Si in $(SiO_4)$. That is, an ionic conductor in the present embodiment may be such that a composition formula thereof is $Li_{9+x}Al_3(P_2O_7)_3(PO_4)_{2-x}(MO_4)_x$, wherein M is formed of one or two or more elements selected from C, Si, Ge, Sn, and Pb.

(a Manufacturing Method for an Ionic Conductor)

Next, a manufacturing method for $Li_{10}Al_3(P_2O_7)_3(PO_4)(GeO_4)$ will be described that is an ionic conductor in the present embodiment.

First, lithium phosphate $(Li_3PO_4)$, aluminum oxide $(Al_2O_3)$, germanium oxide (GeO2), diammonium hydrogen phosphate $((NH_4)_2HPO_4)$ are mixed by using a mortar made of agate. Then, a mixture thereof is put into a platinum crucible and heated to 900° C., subsequently, is slowly cooled to 850° C. at 50° C./H, and subsequently, is slowly cooled to 600° C. at 2° C./H, and subsequently, slow cooling to a room temperature is executed at 200° C./H.

Here, weighed values of lithium phosphate $(Li_3PO_4)$, aluminum oxide $(Al_2O_3)$, germanium oxide $(GeO_2)$, diammonium hydrogen phosphate $((NH_4)_2HPO_4)$ are 4.0878 g, 1.6922 g, 11.5767 g, and 10.2285 g, respectively. Thus, it is possible to fabricate $Li_{10}Al_3(P_2O_7)_3(PO_4)(GeO_4)$ that is an ionic conductor in the present embodiment.

A Second Embodiment

Figure 4:
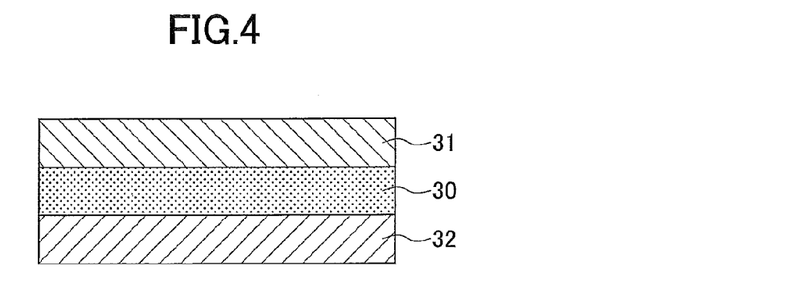
FIG. 4 is a structural diagram of a secondary battery in a second embodiment.

Next, a secondary battery in a second embodiment will be described. A secondary battery in the present embodiment is such that an ionic conductor in the first embodiment is used for a solid electrolyte. Specifically, a secondary battery in the present embodiment is of a structure in such a manner that an electrode 31 that is a positive electrode is provided on one face of a solid electrolyte 30 formed of an ionic conductor in the first embodiment and an electrode 32 that is a negative electrode is provided on the other face thereof, as illustrated in FIG. 4. Here, $Li_9V_3(P_2O_7)_3(PO_4)_2$ is used for the electrode 31 that is a positive electrode and Li is used for the electrode 32 that is a negative electrode.

According to a disclosed ionic conductor and secondary battery, it is possible to provide a high matching property with $Li_9V_3(P_2O_7)_3(PO_4)_2$ that is a positive electrode material and reduce an internal resistance thereof, and hence, it is possible to improve a characteristic of a secondary battery.

Next, practical examples of an ionic conductor in the first embodiment will be described.

Practical Example 1

For Practical Example 1, an LAPPG that was $Li_{9+x}Al_3(P_2O_7)_3(PO_4)_{2-x}(GeO_4)_x$ wherein x was 0.25, namely, $Li_{9.25}Al_3(P_2O_7)_3(PO_4)_{1.75}(GeO_4)_{0.25}$ was fabricated.

Specifically, first, 1.9708 g of lithium carbonate $(Li_2CO_3)$, 0.8818 g of aluminum oxide $(Al_2O_3)$, 0.1510 g of germanium oxide $(GeO_2)$, and 5.9010 g of diammonium hydrogen phosphate $((NH_4)_2HPO_4)$ were weighed. Then, the weighed lithium carbonate, aluminum oxide, germanium oxide, and diammonium hydrogen phosphate were mixed by a ball mill at 200 rpm for 3 hours, and subsequently, a tentative baking thereof was executed under an argon atmosphere at a temperature of 300° C. for 5 hours. Then, the tentatively baked one was milled by a ball mill at 300 rpm for 3 hours, pelleting thereof was executed by using a die with 10 mmφ, and subsequently, a main baking thereof was executed under an argon atmosphere at a temperature of 750° C. for 10 hours, so that an ionic conductor in Practical Example 1 was fabricated. As an electrical conductivity of a fabricated ionic conductor was measured, the electrical conductivity was $3.4\times10^{-7}$ S·cm$^{-1}$.

Practical Example 2

For Practical Example 2, an LAPPG that was $Li_{9+x}Al_3(P_2O_7)_3(PO_4)_{2-x}(GeO_4)_x$ wherein x was 0.5, namely, $Li_{9.5}Al_3(P_2O_7)_3(PO_4)_{1.5}(GeO_4)_{0.5}$ was fabricated.

Specifically, first, 1.9960 g of lithium carbonate ($Li_2CO_3$), 0.8697 g of aluminum oxide ($Al_2O_3$), 0.2979 g of germanium oxide ($GeO_2$), and 5.6323 g of diammonium hydrogen phosphate (($NH_4)_2HPO_4$) were weighed. Then, the weighed lithium carbonate, aluminum oxide, germanium oxide, and diammonium hydrogen phosphate were mixed by a ball mill at 200 rpm for 3 hours, and subsequently, a tentative baking thereof was executed under an argon atmosphere at a temperature of 300° C. for 5 hours. Then, the tentatively baked one was milled by a ball mill at 300 rpm for 3 hours, pelleting thereof was executed by using a die with 10 mm$\phi$, and subsequently, a main baking thereof was executed under an argon atmosphere at a temperature of 750° C. for 10 hours, so that an ionic conductor in Practical Example 2 was fabricated. As an electrical conductivity of a fabricated ionic conductor was measured, the electrical conductivity was $2.2 \times 10^{-7}$ S·cm$^{-1}$.

Practical Example 3

For Practical Example 3, an LAPPG that was $Li_{9+x}Al_3(P_2O_7)_3(PO_4)_{2-x}(GeO_4)_x$ wherein x was 1.0, namely, $Li_{10}Al_3(P_2O_7)_3(PO_4)_{1.0}(GeO_4)_{1.0}$ was fabricated.

Specifically, first, 2.0447 g of lithium carbonate ($Li_2CO_3$), 0.8465 g of aluminum oxide ($Al_2O_3$), 0.5793 g of germanium oxide ($GeO_2$), and 5.1142 g of diammonium hydrogen phosphate (($NH_4)_2HPO_4$) were weighed. Then, the weighed lithium carbonate, aluminum oxide, germanium oxide, and diammonium hydrogen phosphate were mixed by a ball mill at 200 rpm for 3 hours, and subsequently, a tentative baking thereof was executed under an argon atmosphere at a temperature of 300° C. for 5 hours. Then, the tentatively baked one was milled by a ball mill at 300 rpm for 3 hours, pelleting thereof was executed by using a die with 10 mm$\phi$, and subsequently, a main baking thereof was executed under an argon atmosphere at a temperature of 750° C. for 10 hours, so that an ionic conductor in Practical Example 3 was fabricated. As an electrical conductivity of a fabricated ionic conductor was measured, the electrical conductivity was $1.7 \times 10^{-7}$ S·cm$^{-1}$.

Practical Example 4

For Practical Example 4, an LAPPG that was $Li_{9+x}Al_3(P_2O_7)_3(PO_4)_{2-x}(GeO_4)_x$ wherein x was 1.5, namely, $Li_{10.5}Al_3(P_2O_7)_3(PO_4)_{0.5}(GeO_4)_{1.5}$ was fabricated.

Specifically, first, 2.0885 g of lithium carbonate ($Li_2CO_3$), 0.8230 g of aluminum oxide ($Al_2O_3$), 0.8454 g of germanium oxide ($GeO_2$), and 4.6260 g of diammonium hydrogen phosphate (($NH_4)_2HPO_4$) were weighed. Then, the weighed lithium carbonate, aluminum oxide, germanium oxide, and diammonium hydrogen phosphate were mixed by a ball mill at 200 rpm for 3 hours, and subsequently, a tentative baking thereof was executed under an argon atmosphere at a temperature of 300° C. for 5 hours. Then, the tentatively baked one was milled by a ball mill at 300 rpm for 3 hours, pelleting thereof was executed by using a die with 10 mm$\phi$, and subsequently, a main baking thereof was executed under an argon atmosphere at a temperature of 750° C. for 10 hours, so that an ionic conductor in Practical Example 4 was fabricated. As an electrical conductivity of a fabricated ionic conductor was measured, the electrical conductivity was $1.5 \times 10^{-7}$ S·cm$^{-1}$.

Practical Example 5

For Practical Example 5, $Ll_{11}Al_3(P_2O_7)_3(GeO_4)_{2.0}$ that was $Li_{9+x}Al_3(P_2O_7)_3(PO_4)_{2-x}(GeO_4)_x$ wherein x was 2.0 was fabricated.

Specifically, first, 2.1338 g of lithium carbonate ($Li_2CO_3$), 0.8020 g of aluminum oxide ($Al_2O_3$), 1.0987 g of germanium oxide ($GeO_2$), and 4.1585 g of diammonium hydrogen phosphate (($NH_4)_2HPO_4$) were weighed. Then, the weighed lithium carbonate, aluminum oxide, germanium oxide, and diammonium hydrogen phosphate were mixed by a ball mill at 200 rpm for 3 hours, and subsequently, a tentative baking thereof was executed under an argon atmosphere at a temperature of 300° C. for 5 hours. Then, the tentatively baked one was milled by a ball mill at 300 rpm for 3 hours, pelleting thereof was executed by using a die with 10 mm$\phi$, and subsequently, a main baking thereof was executed under an argon atmosphere at a temperature of 750° C. for 10 hours, so that an ionic conductor in Practical Example 5 was fabricated. As an electrical conductivity of a fabricated ionic conductor was measured, the electrical conductivity was $1.0 \times 10^{-7}$ S·cm$^{-1}$.

Practical Example 6

For Practical Example 6, an LAPPS that was $Li_{9+x}Al_3(P_2O_7)_3(PO_4)_{2-x}(SiO_4)_x$ wherein x was 0.25, namely, $Li_{9.25}Al_3(P_2O_7)_3(PO_4)_{1.75}(SiO_4)_{0.25}$ was fabricated.

Specifically, first, 1.9970 g of lithium carbonate ($Li_2CO_3$), 0.8935 g of aluminum oxide ($Al_2O_3$), 0.0891 g of silicon oxide ($SiO_2$), and 5.9768 g of diammonium hydrogen phosphate (($NH_4)_2HPO_4$) were weighed. Then, the weighed lithium carbonate, aluminum oxide, silicon oxide, and diammonium hydrogen phosphate were mixed by a ball mill at 200 rpm for 3 hours, and subsequently, a tentative baking thereof was executed under an argon atmosphere at a temperature of 300° C. for 5 hours. Then, the tentatively baked one was milled by a ball mill at 300 rpm for 3 hours, pelleting thereof was executed by using a die with 10 mm$\phi$, and subsequently, a main baking thereof was executed under an argon atmosphere at a temperature of 750° C. for 10 hours, so that an ionic conductor in Practical Example 6 was fabricated. As an electrical conductivity of a fabricated ionic conductor was measured, the electrical conductivity was $1.5 \times 10^{-7}$ S·cm$^{-1}$.

Practical Example 7

For Practical Example 7, an LAPPS that was $Li_{9+x}Al_3(P_2O_7)_3(PO_4)_{2-x}(SiO_4)_x$ wherein x was 0.5, namely, $Li_{9.5}Al_3(P_2O_7)_3(PO_4)_{1.5}(SiO_4)_{0.5}$ was fabricated.

Specifically, first, 2.0483 g of lithium carbonate ($Li_2CO_3$), 0.8920 g of aluminum oxide ($Al_2O_3$), 0.1763 g of silicon oxide ($SiO_2$), and 5.7787 g of diammonium hydrogen phosphate (($NH_4)_2HPO_4$) were weighed. Then, the weighed lithium carbonate, aluminum oxide, silicon oxide, and diammonium hydrogen phosphate were mixed by a ball mill at 200 rpm for 3 hours, and subsequently, a tentative baking thereof was executed under an argon atmosphere at a temperature of 300° C. for 5 hours. Then, the tentatively baked one was milled by a ball mill at 300 rpm for 3 hours, pelleting thereof was executed by using a die with 10 mm$\phi$, and subsequently, a main baking thereof was executed under an argon atmosphere at a temperature of 750° C. for 10 hours, so that an ionic conductor in Practical Example 7 was fabricated. As an electrical conductivity of a fabricated ionic conductor was measured, the electrical conductivity was $2.4 \times 10^{-7}$ S·cm$^{-1}$.

Practical Example 8

For Practical Example 8, an LAPPS that was $Li_{9+x}Al_3(P_2O_7)_3(PO_4)_{2-x}(SiO_4)_x$ wherein x was 1.0, namely, $Li_{10}Al_3(P_2O_7)_3(PO_4)_{1.0}(SiO_4)_{1.0}$ was fabricated.

Specifically, first, 2.1500 g of lithium carbonate ($Li_2CO_3$), 0.8895 g of aluminum oxide ($Al_2O_3$), 0.3498 g of silicon oxide ($SiO_2$), and 5.3805 g of diammonium hydrogen phosphate (($NH_4)_2HPO_4$) were weighed. Then, weighed lithium carbonate, aluminum oxide, silicon oxide, and diammonium hydrogen phosphate were mixed by a ball mill at 200 rpm for 3 hours, and subsequently, tentative baking thereof was executed under argon atmosphere at a temperature of 300° C. for 5 hours. Then, tentatively baked one was milled by a ball mill at 300 rpm for 3 hours, pelleting thereof was executed by using a die with 10 mmϕ, and subsequently, main baking thereof was executed under argon atmosphere at a temperature of 750° C. for 10 hours, so that an ionic conductor in Practical Example 8 was fabricated. As an electrical conductivity of a fabricated ionic conductor was measured, the electrical conductivity was $3.7 \times 10^{-7}$ S·cm$^{-1}$.

Practical Example 9

For Practical Example 9, an LAPPS that was $Li_{9+x}Al_3(P_2O_7)_3(PO_4)_{2-x}(SiO_4)_x$ wherein x was 1.5, namely, $Li_{10.5}Al_3(P_2O_7)_3(PO_4)_{0.5}(SiO_4)_{1.5}$ was fabricated.

Specifically, first, 2.2521 g of lithium carbonate ($Li_2CO_3$), 0.8872 g of aluminum oxide ($Al_2O_3$), 0.5238 g of silicon oxide ($SiO_2$), and 4.9853 g of diammonium hydrogen phosphate (($NH_4)_2HPO_4$) were weighed. Then, the weighed lithium carbonate, aluminum oxide, silicon oxide, and diammonium hydrogen phosphate were mixed by a ball mill at 200 rpm for 3 hours, and subsequently, a tentative baking thereof was executed under an argon atmosphere at a temperature of 300° C. for 5 hours. Then, the tentatively baked one was milled by a ball mill at 300 rpm for 3 hours, pelleting thereof was executed by using a die with 10 mmϕ, and subsequently, a main baking thereof was executed under an argon atmosphere at a temperature of 750° C. for 10 hours, so that an ionic conductor in Practical Example 9 was fabricated. As an electrical conductivity of a fabricated ionic conductor was measured, the electrical conductivity was $4.1 \times 10^{-7}$ S·cm$^{-1}$.

Practical Example 10

For Practical Example 10, $Li_{11}Al_3(P_2O_7)_3(SiO_4)_{2.0}$ that was $Li_{9+x}Al_3(P_2O_7)_3(PO_4)_{2-x}(SiO_4)_x$ wherein x was 2.0 was fabricated.

Specifically, first, 2.5470 g of lithium carbonate ($Li_2CO_3$), 0.8855 g of aluminum oxide ($Al_2O_3$), 0.6954 g of silicon oxide ($SiO_2$), and 4.5880 g of diammonium hydrogen phosphate (($NH_4)_2HPO_4$) were weighed. Then, the weighed lithium carbonate, aluminum oxide, silicon oxide, and diammonium hydrogen phosphate were mixed by a ball mill at 200 rpm for 3 hours, and subsequently, a tentative baking thereof was executed under an argon atmosphere at a temperature of 300° C. for 5 hours. Then, the tentatively baked one was milled by a ball mill at 300 rpm for 3 hours, pelleting thereof was executed by using a die with 10 mmO, and subsequently, a main baking thereof was executed under an argon atmosphere at a temperature of 750° C. for 10 hours, so that an ionic conductor in Practical Example 10 was fabricated. As an electrical conductivity of a fabricated ionic conductor was measured, the electrical conductivity was $2.6 \times 10^{-7}$ S·cm$^{-1}$.

Practical Example 11

For Practical Example 11, an LAPPSG that was $Li_{9+x}Al_3(P_2O_7)_3(PO_4)_{2-x}(SiO_4)_{x/2}(GeO_4)_{x/2}$ wherein x was 0.5, namely, $Li_{9.5}Al_3(P_2O_7)_3(PO_4)_{1.5}(SiO_4)_{0.25}(GeO_4)_{0.25}$ was fabricated.

Specifically, first, 2.2290 g of lithium carbonate ($Li_2CO_3$), 0.8807 g of aluminum oxide ($Al_2O_3$), 0.0877 g of silicon oxide ($SiO_2$), 0.1509 g of germanium oxide ($GeO_2$), and 5.7018 g of diammonium hydrogen phosphate (($NH_4)_2HPO_4$) were weighed. Then, the weighed lithium carbonate, aluminum oxide, silicon oxide, germanium oxide, and diammonium hydrogen phosphate were mixed by a ball mill at 200 rpm for 3 hours, and subsequently, a tentative baking thereof was executed under an argon atmosphere at a temperature of 300° C. for 5 hours. Then, the tentatively baked one was milled by a ball mill at 300 rpm for 3 hours, pelleting thereof was executed by using a die with 10 mmϕ, and subsequently, a main baking thereof was executed under an argon atmosphere at a temperature of 750° C. for 10 hours, so that an ionic conductor in Practical Example 11 was fabricated. As an electrical conductivity of a fabricated ionic conductor was measured, the electrical conductivity was $1.5 \times 10^{-7}$ S·cm$^{-1}$.

Practical Example 12

For Practical Example 12, an LAPPSG that was $Li_{9+x}Al_3(P_2O_7)_3(PO_4)_{2-x}(SiO_4)_{x/2}(GeO_4)_{x/2}$ wherein x was 1.0, namely, $Li_{10}Al_3(P_2O_7)_3(PO_4)_{1.0}(SiO_4)_{0.5}(GeO_4)_{0.5}$ was fabricated.

Specifically, first, 2.0957 g of lithium carbonate ($Li_2CO_3$), 0.8670 g of aluminum oxide ($Al_2O_3$), 0.1720 g of silicon oxide ($SiO_2$), 0.2980 g of germanium oxide ($GeO_2$), and 5.2437 g of diammonium hydrogen phosphate (($NH_4)_2HPO_4$) were weighed. Then, the weighed lithium carbonate, aluminum oxide, silicon oxide, germanium oxide, and diammonium hydrogen phosphate were mixed by a ball mill at 200 rpm for 3 hours, and subsequently, a tentative baking thereof was executed under an argon atmosphere at a temperature of 300° C. for 5 hours.

Then, the tentatively baked one was milled by a ball mill at 300 rpm for 3 hours, pelleting thereof was executed by using a die with 10 mmϕ, and subsequently, a main baking thereof was executed under an argon atmosphere at a temperature of 750° C. for 10 hours, so that an ionic conductor in Practical Example 12 was fabricated. As an electrical conductivity of a fabricated ionic conductor was measured, the electrical conductivity was $3.5 \times 10^{-7}$ S·cm$^{-1}$.

Practical Example 13

For Practical Example 13, $Li_{11}Al_3(P_2O_7)_3(SiO_4)_{1.0}(GeO_4)_{1.0}$ that was $Li_{9+x}Al_3(P_2O_7)_3(PO_4)_{2-x}(SiO_4)_{x/2}(GeO_4)_{x/2}$ wherein x was 2.0 was fabricated.

Specifically, first, 2.2389 g of lithium carbonate ($Li_2CO_3$), 0.8429 g of aluminum oxide ($Al_2O_3$), 0.3300 g of silicon oxide ($SiO_2$), 0.5733 g of germanium oxide ($GeO_2$), and 4.3653 g of diammonium hydrogen phosphate (($NH_4)_2HPO_4$) were weighed. Then, the weighed lithium carbonate, aluminum oxide, silicon oxide, germanium oxide, and diammonium hydrogen phosphate were mixed by a ball mill at 200 rpm for 3 hours, and subsequently, a tentative baking thereof was executed under an argon atmosphere at a temperature of 300° C. for 5 hours. Then, the tentatively baked one was milled by a ball mill at 300 rpm for 3 hours, pelleting thereof was executed by using a die with 10 mmφ, and subsequently, a main baking thereof was executed under an argon atmosphere at a temperature of 750° C. for 10 hours, so that an ionic conductor in Practical Example 13 was fabricated. As an electrical conductivity of a fabricated ionic conductor was measured, the electrical conductivity was $1.4 \times 10^{-7}$ S·cm$^{-1}$.

Figure 5:
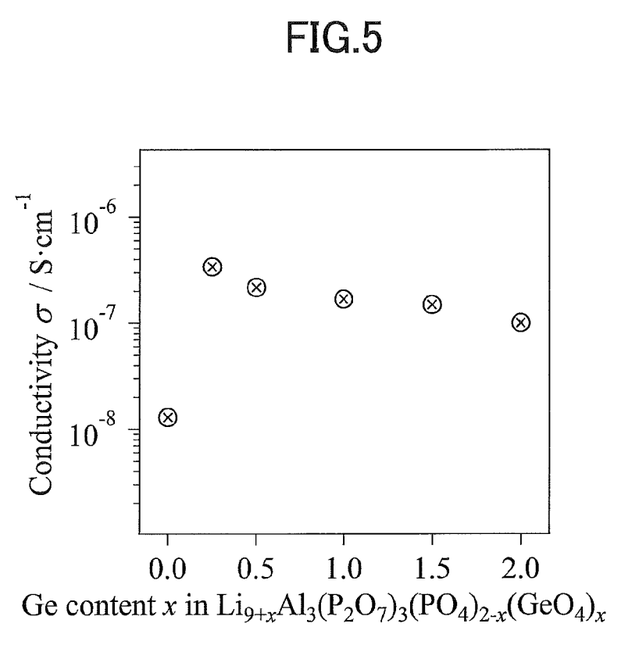
FIG. 5 is a correlation diagram between composition ratios and electrical conductivities of ionic conductors in Practical Examples 1-5.
Figure 6:
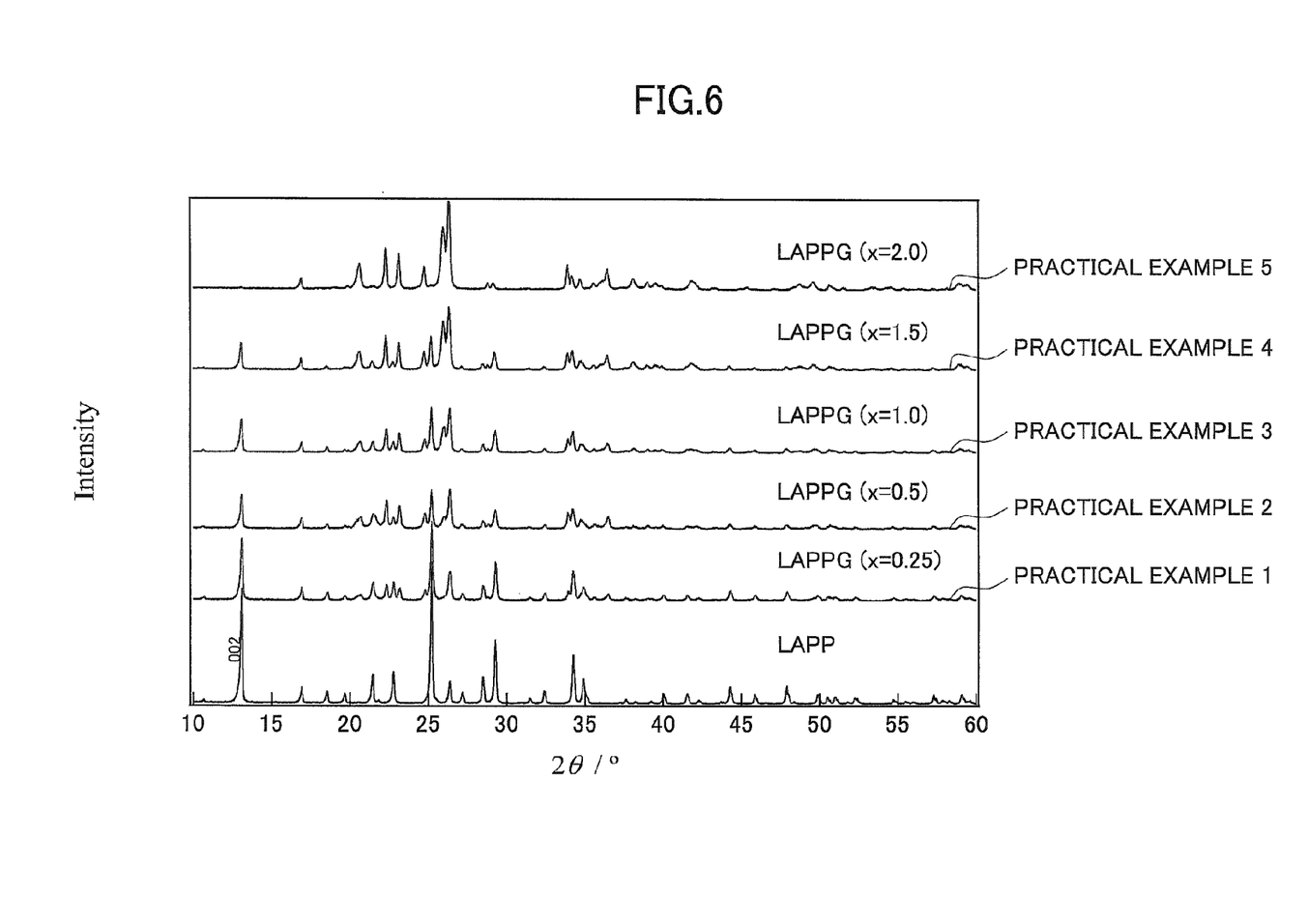
FIG. 6 is a diagram that illustrates results of X-ray diffraction for ionic conductors in Practical Examples 1-5.
Figure 7:
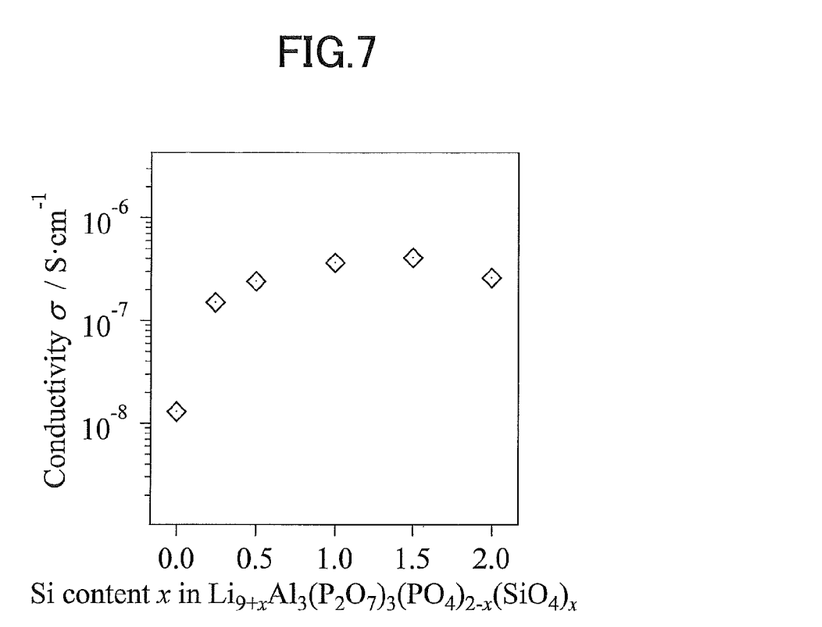
FIG. 7 is a correlation diagram between composition ratios and electrical conductivities of ionic conductors in Practical Examples 6-10.
Figure 8:
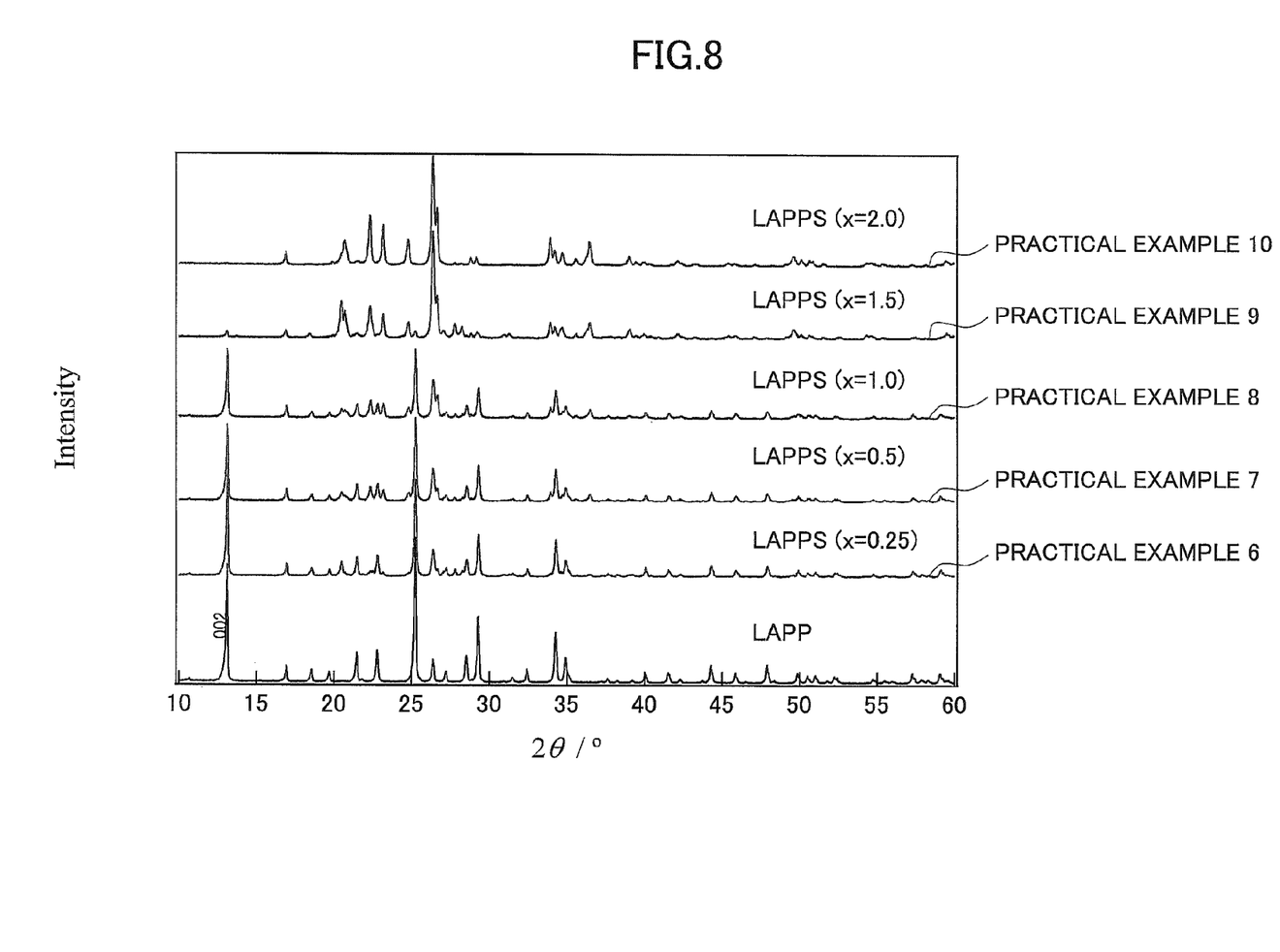
FIG. 8 is a diagram that illustrates results of X-ray diffraction for ionic conductors in Practical Examples 6-10.
Figure 9:
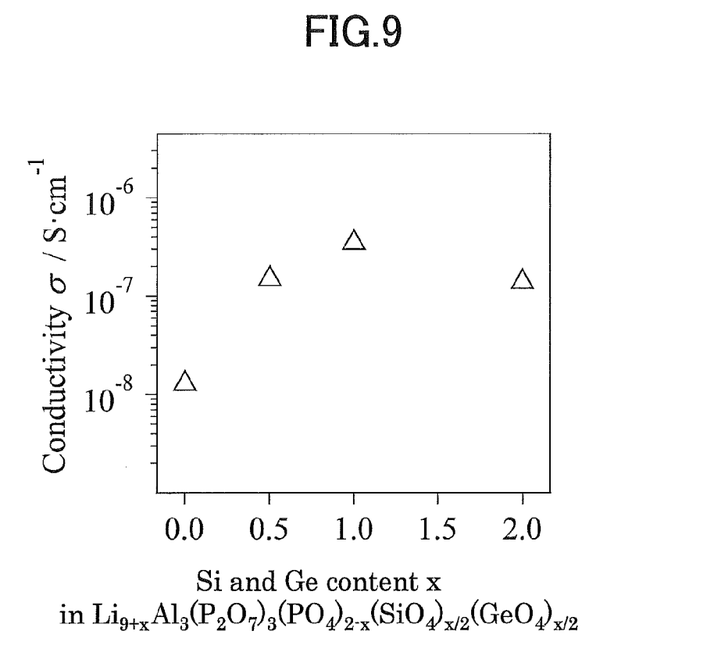
FIG. 9 is a correlation diagram between composition ratios and electrical conductivities of ionic conductors in Practical Examples 11-13.
Figure 10:
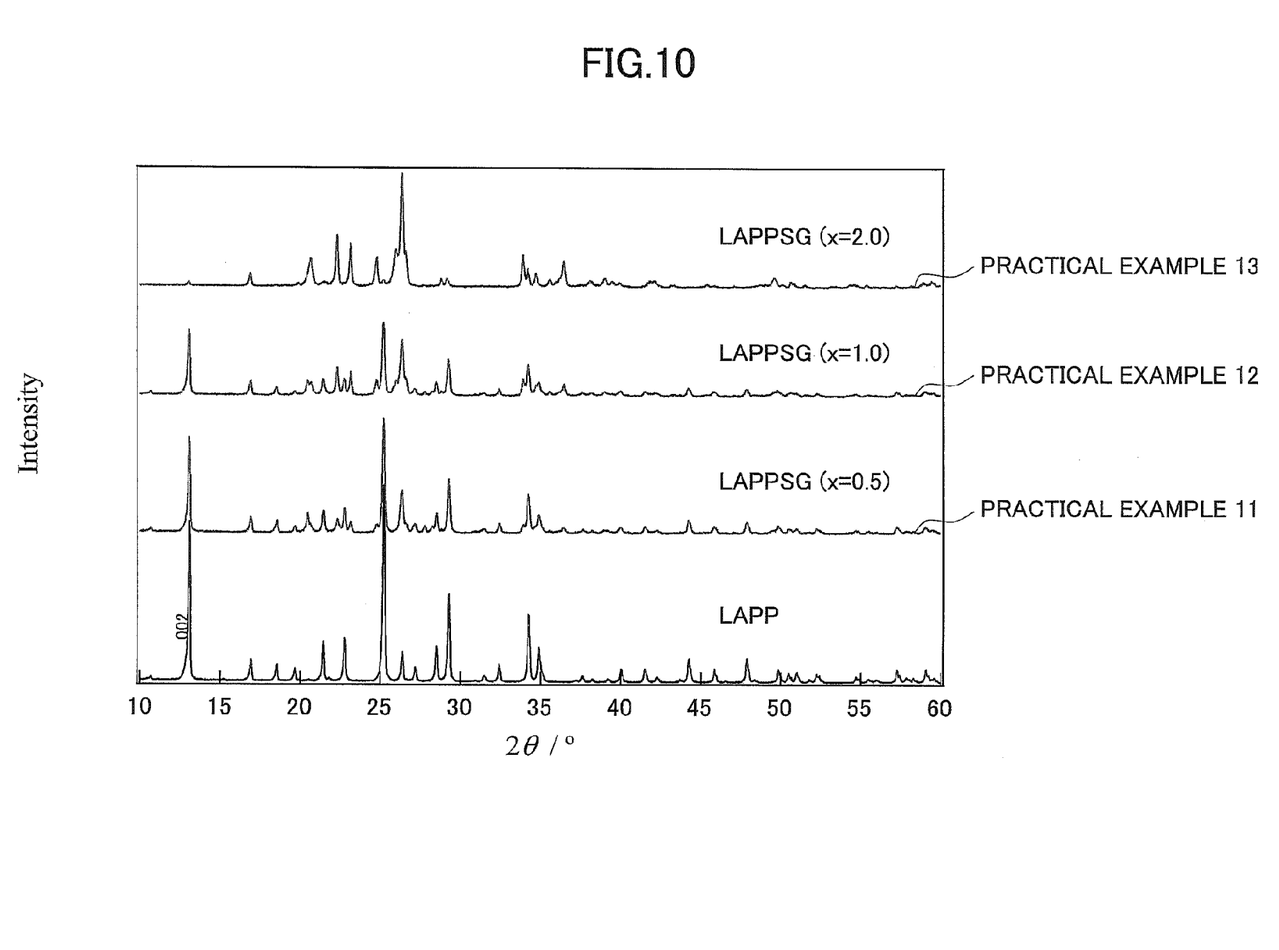
FIG. 10 is a diagram that illustrates results of X-ray diffraction for ionic conductors in Practical Examples 11-13.

The electrical conductivities of the ionic conductors in Practical Examples 1-5 are illustrated in FIG. 5 and Table 1 and results of X-ray diffraction thereof are illustrated in FIG. 6. Furthermore, the electrical conductivities of the ionic conductors in Practical Examples 6-10 are illustrated in FIG. 7 and Table 2 and results of X-ray diffraction thereof are illustrated in FIG. 8. Furthermore, the electrical conductivities of the ionic conductors in Practical Examples 11-13 are illustrated in FIG. 9 and Table 3 and results of X-ray diffraction thereof are illustrated in FIG. 10.

TABLE 1

|  | x | Electrical conductivity [S · cm$^{-1}$] |
|---|---|---|
| Li$_9$Al$_3$(P$_2$O$_7$)$_3$(PO$_4$)$_2$ | 0.0 | $1.3 \times 10^{-8}$ |
| Practical Example 1 | 0.25 | $3.4 \times 10^{-7}$ |
| Practical Example 2 | 0.5 | $2.2 \times 10^{-7}$ |
| Practical Example 3 | 1.0 | $1.7 \times 10^{-7}$ |
| Practical Example 4 | 1.5 | $1.5 \times 10^{-7}$ |
| Practical Example 5 | 2.0 | $1.0 \times 10^{-7}$ |

TABLE 2

|  | x | Electrical conductivity [S · cm$^{-1}$] |
|---|---|---|
| Li$_9$Al$_3$(P$_2$O$_7$)$_3$(PO$_4$)$_2$ | 0.0 | $1.3 \times 10^{-8}$ |
| Practical Example 6 | 0.25 | $1.5 \times 10^{-7}$ |
| Practical Example 7 | 0.5 | $2.4 \times 10^{-7}$ |
| Practical Example 8 | 1.0 | $3.7 \times 10^{-7}$ |
| Practical Example 9 | 1.5 | $4.1 \times 10^{-7}$ |
| Practical Example 10 | 2.0 | $2.6 \times 10^{-7}$ |

TABLE 3

|  | x | Electrical conductivity [S · cm$^{-1}$] |
|---|---|---|
| Li$_9$Al$_3$(P$_2$O$_7$)$_3$(PO$_4$)$_2$ | 0.0 | $1.3 \times 10^{-8}$ |
| Practical Example 11 | 0.5 | $1.5 \times 10^{-7}$ |
| Practical Example 12 | 1.0 | $3.5 \times 10^{-7}$ |
| Practical Example 13 | 2.0 | $1.4 \times 10^{-7}$ |

Although an embodiment has been described in detail above, limitation to a particular embodiment is not provided and a variety of alterations and modifications are possible within a scope recited in what is claimed.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An ionic conductor, wherein a composition formula thereof is Li$_{9+x}$Al$_3$(P$_2$O$_7$)$_3$(PO$_4$)$_{2-x}$(GeO$_4$)$_x$, wherein x is a range of $0 < x \leq 2.0$.

2. An ionic conductor, wherein a composition formula thereof is Li$_{9+x}$Al$_3$(P$_2$O$_7$)$_3$(PO$_4$)$_{2-x}$(SiO$_4$)$_x$, wherein x is a range of $0 < x \leq 2.0$.

3. An ionic conductor, wherein a composition formula thereof is Li$_{9+x}$Al$_3$(P$_2$O$_7$)$_3$(PO$_4$)$_{2-x}$(SiO$_4$)$_{x/2}$(GeO$_4$)$_{x/2}$, wherein x is a range of $0 < x \leq 2.0$.

4. An ionic conductor, wherein a composition formula thereof is Li$_{9+x}$Al$_3$(P$_2$O$_7$)$_3$(PO$_4$)$_{2-x}$(MO$_4$)$_x$, wherein M is selected from a group consisting of C, Si, Ge, Sn, Pb, and any combination thereof, and wherein x is a range of $0 < x \leq 2.0$.

5. The ionic conductor as claimed in claim 1, wherein the ionic conductor has a crystal structure of space group P-3c1.

6. The ionic conductor as claimed in claim 2, wherein the ionic conductor has a crystal structure of space group P-3c1.

7. The ionic conductor as claimed in claim 3, wherein the ionic conductor has a crystal structure of space group P-3c1.

8. The ionic conductor as claimed in claim 4, wherein the ionic conductor has a crystal structure of space group P-3c1.

9. A secondary battery, comprising:
a solid electrolyte formed of the ionic conductor as claimed in claim 1;
an electrode formed on one face of the solid electrolyte; and
an electrode formed on the other face of the solid electrolyte.

10. A secondary battery, comprising:
a solid electrolyte formed of the ionic conductor as claimed in claim 2;
an electrode formed on one face of the solid electrolyte; and
an electrode formed on the other face of the solid electrolyte.

11. A secondary battery, comprising:
a solid electrolyte formed of the ionic conductor as claimed in claim 3;
an electrode formed on one face of the solid electrolyte; and
an electrode formed on the other face of the solid electrolyte.

12. A secondary battery, comprising:
a solid electrolyte formed of the ionic conductor as claimed in claim 4;
an electrode formed on one face of the solid electrolyte; and
an electrode formed on the other face of the solid electrolyte.

13. The secondary battery as claimed in claim 9, wherein the electrode formed on one face is formed of Li$_9$V$_3$(P$_2$O$_7$)$_3$(PO$_4$)$_2$.

14. The secondary battery as claimed in claim 10, wherein the electrode formed on one face is formed of Li$_9$V$_3$(P$_2$O$_7$)$_3$(PO$_4$)$_2$.

15. The secondary battery as claimed in claim 11, wherein the electrode formed on one face is formed of Li$_9$V$_3$(P$_2$O$_7$)$_3$(PO$_4$)$_2$.

16. The secondary battery as claimed in claim 12, wherein the electrode formed on one face is formed of $Li_9V_3(P_2O_7)_3(PO_4)_2$.

17. The secondary battery as claimed in claim 9, wherein the ionic conductor and the electrode formed on one face have an identical crystal structure.

18. The secondary battery as claimed in claim 10, wherein the ionic conductor and the electrode formed on one face have an identical crystal structure.

19. The secondary battery as claimed in claim 11, wherein the ionic conductor and the electrode formed on one face have an identical crystal structure.

20. The secondary battery as claimed in claim 12, wherein the ionic conductor and the electrode formed on one face have an identical crystal structure.

* * * * *